(12) United States Patent
Hirt et al.

(10) Patent No.: US 7,521,519 B1
(45) Date of Patent: Apr. 21, 2009

(54) ORGANIC COMPOUNDS

(75) Inventors: Thomas Hirt, Rebstein (CH); Jacalyn Marie Schremmer, Atlanta, GA (US); Troy Vernon Holland, Suwanee, GA (US); Dieter Lohmann, Munchenstein (CH)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/525,158

(22) Filed: Mar. 14, 2000

Related U.S. Application Data

(60) Provisional application No. 60/183,047, filed on Mar. 14, 2000.

(51) Int. Cl.
C08G 77/42 (2006.01)

(52) U.S. Cl. .................. 528/33; 523/107; 528/26; 528/29; 528/25; 528/32; 568/615

(58) Field of Classification Search ............ 523/107; 528/33, 26, 29, 25, 32; 568/615
See application file for complete search history.

(56) References Cited

U.S. PATENT DOCUMENTS

| | | | |
|---|---|---|---|
| 4,837,289 A | 6/1989 | Mueller et al. | 526/279 |
| 5,219,965 A | 6/1993 | Valint, Jr. et al. | 526/245 |
| 5,364,918 A | 11/1994 | Valint, Jr. et al. | 526/245 |
| 5,589,563 A | 12/1996 | Ward et al. | 528/44 |
| 5,760,100 A | 6/1998 | Nicolson et al. | 523/106 |
| 5,981,615 A * | 11/1999 | Meijs et al. | |
| 6,043,328 A * | 3/2000 | Domschke et al. | |

FOREIGN PATENT DOCUMENTS

| | | |
|---|---|---|
| EP | 0 291 452 A2 | 4/1988 |
| EP | 0 330 616 A1 | 2/1989 |
| WO | WO 96/31791 | 10/1996 |
| WO | WO 97/00274 | 1/1997 |
| WO | WO 97/49740 | 12/1997 |

OTHER PUBLICATIONS

International Search Report.

* cited by examiner

*Primary Examiner*—Robert Dawson
*Assistant Examiner*—Kuo-Liang Peng
(74) *Attorney, Agent, or Firm*—Jian S. Zhou

(57) ABSTRACT

The invention relates to novel crosslinkable copolymers of formula

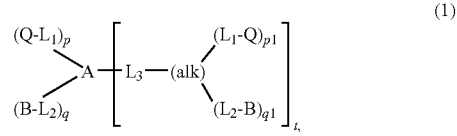

(1)

wherein the variables are as defined in the claims. The copolymers of the invention are especially useful for the manufacture of biomedical molding, for example ophthalmic moldings such as in particular contact lenses.

12 Claims, No Drawings

ORGANIC COMPOUNDS

This is an application based on provisional application Ser. No. 60/183,047, filed Mar. 14, 2000.

The present invention relates to novel crosslinkable copolymers, to a process for the preparation thereof and to the use thereof for the manufacture of moldings, especially ophthalmic moldings.

U.S. Pat. Nos. 5,760,100 or 5,807,944 disclose crosslinkable amphiphilic block copolymers comprising a hydrophobic middle block to which are linked two or more hydrophilic blocks. While the materials disclosed therein have proven to be very effective as bulk material for the manufacture of biomedical articles, in particular ophthalmic moldings, their surface properties, in particular the wettability characteristics, are in general not sufficient to use them as a biomedical device without previously applying a suitable coating on their surface.

Therefore, there is a need to provide polymeric materials which may be used for the manufacture of biomedical articles such as ophthalmic moldings per se without a subsequent surface modication. Surprisingly, it now has been found that articles, particularly biomedical devices such as contact lenses, with an improved wettability may be obtained from novel amphiphilic block copolymers comprising a hydrophobic segment to which are covalently attached moieties comprising a crosslinkable ethylenically unsaturated group as well as surface-modifying hydrophilic segments.

The present invention therefore relates to an amphiphilic block copolymer of formula

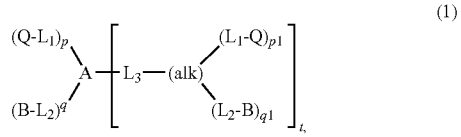
(1)

wherein A is a hydrophobic polysiloxane or perfluoroalkyl polyether segment;

B is a surface-modifying hydrophilic segment having a weight average molecular weight of $\geq 100$ that is devoid of a crosslinkable group;

Q is a moiety comprising at least one crosslinkable ethylenically unsaturated group;

(alk) is $C_2$-$C_{20}$-alkylene which is unsubstituted or substituted by hydroxy;

$L_1$, $L_2$ and $L_3$ are each independently of the other a linking group;

p1 and q1 are each independently of the other an integer from 1 to 12; and either t is 0 and p and q are each independently of the other an integer from 1 to 25; or t is an integer from 1 to 8 and p and q are each 0.

In case that t is 0, p and q are each independently of the other preferably an integer from 2 to 20, more preferably 2 to 15 and in particular 2 to 10. In case that p and q are each 0, t is preferably an integer from 1 to 6, more preferably 1 to 4 and in particular 2. p1 is preferably an integer from 1 to 6, more preferably 1 to 4 and in particular 1 or 2. q1 is preferably an integer from 1 to 10, more preferably 1 to 8, and in particular 1 to 4.

One group of suitable block copolymers of the invention conforms to the formula

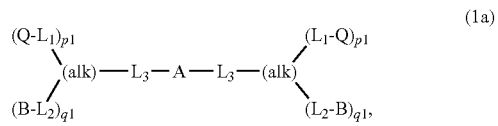
(1a)

wherein A, B, $L_1$, $L_2$, $L_3$, Q, (alk), p1 and q1 are each as defined above.

Another group of suitable block copolymers of the invention conforms to formula

(1b), wherein A, B, $L_1$, $L_2$ and Q are each as defined above, and p and q are each independently of the other an integer from 1 to 25, preferably 2 to 20, more preferably 2 to 15 and in particular 2 to 10.

In one embodiment of the invention A is a polysiloxane segment of formula

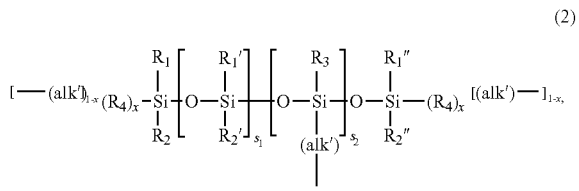
(2)

wherein (alk') is alkylene having 1 to 20 carbon atoms which may be interrupted by —O—;

x is 0 or 1;

80 to 100% of the radicals $R_1$, $R_1'$, $R_1''$, $R_2$, $R_2'$, $R_2''$, $R_3$ and $R_4$, independently of one another, are $C_1$-$C_8$-alkyl, and 0-20% of the radicals $R_1$, $R_1'$, $R_1''$, $R_2$, $R_2'$, $R_2''$, $R_3$ and $R_4$, independently of one another, are unsubstituted or $C_1$-$C_4$ alkyl- or $C_1$-$C_4$-alkoxy-substituted phenyl, fluoro($C_1$-$C_{18}$-alkyl) or cyano($C_1$-$C_{12}$-alkyl), $s_1$ is an integer from 5 to 700;

$s_2$ is the sum of (p+q+t−2) if x is 0, and is the sum of (p+q+t) if x is 1; wherein p, q and t are as defined above, and the sum ($s_1$+$s_2$) is from 5 to 700.

In a preferred meaning of the polysiloxanes of formula (2), the sum ($s_1$+$s_2$) is an integer from 10 to 500, more preferably 10 to 300, even more preferably 20 to 150 and in particular preferably 50 to 140.

(alk') is preferably $C_2$-$C_8$-alkylene, which may be interrupted by —O— and more preferably $C_2$-$C_6$-alkylene which may be interrupted by —O—. Examples of particular preferred radicals (alk') are linear or branched $C_2$-$C_6$ alkylene or a radical —$(CH_2)_{1-3}$—O—$(CH_2)_{1-3}$—, especially $C_2$-$C_4$-alkylene or a radical —$(CH_2)_{2-3}$—O—$(CH_2)_{2-3}$—.

Preferably the radicals $R_1$, $R_1'$, $R_1''$, $R_2$, $R_2'$, $R_2''$, $R_3$ and $R_4$ are each independently of one another $C_1$-$C_6$-alkyl, more preferably each $C_1$-$C_4$-alkyl, more preferably each $C_1$-$C_2$-alkyl and in particular each methyl.

One embodiment of suitable polysiloxane hydrophobic blocks (A) emcompasses a radical of the above formula (2), wherein x is 0, s2 is 0, s1 is an integer from 5 to 700, preferably 10 to 500, more preferably 10 to 300, even more preferably 20 to 150 and in particular preferably 50 to 140, $R_1$, $R_1'$, $R_1''$, $R_2$, $R_2'$, $R_2''$ and $R_3$ are each independently of one another $C_1$-$C_8$-alkyl, and for (alk') the above given meanings and preferences apply. In this case, either t in formula (1) is 0 and p and q are each 1, or, preferably, p and q are each 0 and t is 2.

Another embodiment of suitable polysiloxane hydrophobic blocks (A) emcompasses a radical or the above formula (2), wherein x is 0, $s_2$ is the sum of (p+q+t−2), and for $R_1$, $R_1'$, $R_1''$, $R_2$, $R_2'$, $R_2''$, $R_3$, (alk'), p, q and t the above-given meanings and preferences each apply.

Still another embodiment of suitable polysiloxane hydrophobic blocks (A) emcompasses a radical of the above formula (2), wherein x is 1, $s_2$ is the sum of (p+q+t), and for $R_1$, $R_1'$, $R_1''$, $R_2$, $R_2'$, $R_2''$, $R_3$, $R_4$, p, q and t the above-given meanings and preferences each apply.

In another embodiment of the invention, A is a perfluoroalkyl polyether segment of formula

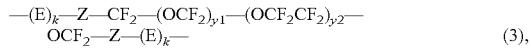

$$—(E)_k—Z—CF_2—(OCF_2)_{y1}—(OCF_2CF_2)_{y2}—OCF_2—Z—(E)_k— \quad (3),$$

in which y1+y2 is a number in the range from 10 to 100; each Z, independently of the other, is a divalent radical having up to 12 carbon atoms or a bond; each E, independently of the others, is alkoxy, e.g. —$(OCH_2CH_2)_r$—, where r has a value of from 0 to 2 as a statistical average, and where the link —Z—E— represents the sequence —Z—$(OCH_2CH_2)_r$—; and k is 0 or 1;

Z is preferably a bond, $C_1$-$C_8$-alkylene or —CONH-phenylene, in which the —CO— moiety is linked to a $CF_2$ group. Z is particularly preferably $C_1$-$C_4$-alkylene, in particular methylene.

The perfluoroalkoxy units $OCF_2$ and $OCF_2CF_2$ having the indices y1 and y2 in Formula (3) can have a random distribution. The sum of the indices y1+y2 is preferably a number in the range from 10 to 50, particularly preferably from 10 to 30. The ratio y1:y2 is preferably in the range from 0.5 to 1.5, in particular in the range from 0.8 to 1.2.

In one embodiment of the invention, the segment A may comprise one of the polymers illustrated above. According to another embodiment, the polymer in segment A may comprise more than one kind of polymers as illustrated above, e.g., may comprise polysiloxane subsegments of formula (2) and perfluoroalkylene polyether units of formula (3). Preferably, segment A is a polysiloxane of formula (2).

Segments A of the prepolymers of the invention have a mean molecular weight of for example in the range from about 1,000 to about 50,000, preferably in the range from about 1,500 to about 30000 and particularly preferably in the range from about 2,000 to about 20,000.

$L_1$, $L_2$ and $L_3$ are each independently of the other, for example, a bivalent linking group of formula

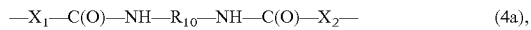

—$X_1$—C(O)—NH—$R_{10}$—NH—C(O)—$X_2$— (4a),

—$X_1$—C(O)—$R_{10}$—C(O)—$X_2$— (4b),

—$X_1$—C(O)— (4c),

—C(O)—$X_2$— (4d),

—$X_1$—C(O)—$X_2$— (4e), wherein $X_1$ and $X_2$ are each independently of the other a group —O—, —S— or —$NR_0$—, $R_0$ is hydrogen or $C_1$-$C_4$-alkyl, and $R_{10}$ is linear or branched $C_1$-$C_{18}$-alkylene or unsubstituted or $C_1$-$C_4$-alkyl- or $C_1$-$C_4$-alkoxy-substituted $C_6$-$C_{10}$-arylene, $C_7$-$C_{18}$-aralkylene, $C_6$-$C_{10}$-arylene-$C_1$-$C_2$-alkylene-$C_6$-$C_{10}$-arylene, $C_3$-$C_8$-cycloalkylene, $C_3$-$C_8$-cycloalkylene-$C_1$-$C_6$-alkylene, $C_3$-$C_8$-cycloalkylene-$C_1$-$C_2$-alkylene-$C_3$-$C_8$-cycloalkylene or $C_1$-$C_6$-alkylene-$C_3$-$C_8$-cycloalkylene-$C_1$-$C_6$-alkylene.

The linking groups $L_1$ and $L_2$ of formulae (4a)-(4e) are to be understood that the left bond is in each case directed to A or (alk) and the right bond is directed to Q or B. The linking group $L_3$ of formulae (4a)-(4e) is to be understood that the left bond is directed to A and the right bond is directed to (alk).

If $X_1$ or $X_2$ is a group —$NR_0$—, $R_0$ is preferably methyl, ethyl or in particular hydrogen.

In formulae (4a)-(4e) $X_1$ and $X_2$ are each independently of the other preferably a group —)— or —$NR_0$— and more preferably —O— or —NH—.

$R_{10}$ as alkylene in formulae (4a) and (4b) is preferably linear or branched $C_1$-$C_{12}$-alkylene, more preferably $C_1$-$C_6$-alkylene and most preferably $C_1$-$C_4$-alkylene.

$R_{10}$ as alkylene in formula (4a) is preferably a linear or branched $C_3$-$C_{14}$alkylene radical, more preferably a linear or branched $C_4$-$C_{12}$alkylene radical and most preferably a linear or branched $C_6$-$C_{10}$alkylene radical. Some preferred alkylene radicals are 1,4-butylene, 2,2-dimethyl-1,4-butylene, 1,5-pentylene, 2,2-dimethyl-1,5-pentylene, 1,6-hexylene, 2,2,3- or 2,2,4-trimethyl-1,5-pentylene, 2,2-dimethyl-1,6-hexylene, 2,2,3- or 2,2,4- or 2,2,5-trimethyl-1,6-hexylene, 2,2-dimethyl-1,7-heptylene, 2,2,3- or 2,2,4- or 2,2,5- or 2,2,6-trimethyl-1,7-heptylene, 1,8-octylene, 2,2-dimethyl-1,8-octylene and 2,2,3- or 2,2,4- or 2,2,5- or 2,2,6- or 2,2,7-trimethyl-1,8-octylene.

When $R_{10}$ is arylene, it is, for example, naphthylene or especially phenylene, each of which may be substituted, for example, by $C_1$-$C_4$-alkyl or by $C_1$-$C_4$-alkoxy. Preferably, $R_{10}$ as arylene is 1,3- or 1,4-phenylene that is unsubstituted or substituted by $C_1$-$C_4$-alkyl or by $C_1$-$C_4$-alkoxy in the ortho-position to at least one linkage site. Examples of substituted arylene are 1-methyl-2,4-phenylene, 1,5-dimethyl-2,4-phenylene, 1-methoxy-2,4-phenylene and 1-methyl-2,7-naphthylene.

$R_{10}$ as aralkylene is preferably naphthylalkylene and most preferably phenylalkylene. The alkylene group in aralkylene contains preferably from 1 to 12, more preferably from 1 to 6 and most preferably from 1 to 4 carbon atoms. Most preferably, the alkylene group in aralkylene is methylene or ethylene. Some examples are 1,3- or 1,4-benzylene, naphth-2yl-7-methylene, 6-methyl-1,3- or -1,4-benzylene and 6-methoxy-1,3- or -1,4-benzylene.

When $R_{10}$ is cycloalkylene, it is preferably $C_5$-$C_6$cycloalkylene and most preferably cyclohexylene that is unsubstituted or substituted by methyl. Some examples are 1,3-cyclobutylene, 1,3-cyclopentylene, 1,3- or 1,4-cyclohexylene, 1,3- or 1,4-cycloheptylene, 1,3- or 1,4- or 1,5-cyclooctylene, 4-methyl-1,3-cyclopentylene, 4-methyl-1,3-cyclohexylene, 4,4-dimethyl-1,3-cyclohexylene, 3-methyl- or 3,3-dimethyl-1,4-cyclohexylene, 3,5-dimethyl-1,3-cyclohexylene and 2,4-dimethyl-1,4-cyclohexylene.

When $R_{10}$ is cycloalkylene-alkylene, it is preferably cyclopentylene-$C_1$-$C_4$-alkylene and especially cyclohexylene-$C_1$-$C_4$-alkylene, each unsubstituted or mono- or poly-substituted by $C_1$-$C_4$-alkyl, especially methyl. More preferably, the group cycloalkylene-alkylene is cyclohexylene-ethylene and, most preferably, cyclohexylene-methylene, each unsubstituted or substituted in the cyclohexylene radical by from 1 to 3 methyl groups. Some examples are cyclopent-1-yl-3-methylene, 3-methyl-cyclopent-1-yl-3-methylene, 3,4-dimethyl-cyclopent-1-yl-3-methylene, 3,4,4-trimethyl-cyclopent-1-yl-3-methylene, cyclohex-1-yl-3- or 14-methylene, 3- or 4- or 5-methyl-cyclohex-1-yl-3- or -4-methylene, 3,4- or 3,5-dimethyl-cyclohex-1-yl-3- or -4-methylene and 3,4,5- or 3,4,4- or 3,5,5-trimethyl-cyclohex-1-yl-3- or -4-methylene.

When $R_{10}$ is alkylene-cycloalkylene-alkylene, it is preferably $C_1$-$C_4$-alkylene-cyclopentylene-$C_1$-$C_4$-alkylene and especially $C_1$-$C_4$-alkylene-cyclohexylene-$C_1$-$C_4$-alkylene, each unsubstituted or mono- or poly-substituted by $C_1$-$C_4$-alkyl, especially methyl. More preferably, the group alkylene-cycloalkylene-alkylene is ethylene-cyclohexylene-ethylene and, most preferably, is methylene-cyclohexylene-methylene, each unsubstituted or substituted in the cyclohexylene radical by from 1 to 3 methyl groups. Some examples are cyclopentane-1,3-dimethylene, 3-methyl-cyclopentane-1,3-dimethylene, 3,4-dimethyl-cyclopentane-1,3-dimethylene, 3,4,4-trimethyl-cyclopentane-1,3-dimethylene, cyclohexane-1,3- or 11,4-dimethylene, 3- or 4- or 5-methyl-cyclohexane-1,3- or -1,4-dimethylene, 3,4- or 3,5-dimethyl-cyclohexane-1,3- or -1,4-dimethylene, 3,4,5- or 3,4,4- or 3,5,5-trimethyl-cyclohexane-1,3- or -1,4-dimethylene.

$R_{10}$ as $C_3$-$C_8$-cycloalkylene-$C_1$-$C_2$-alkylene-$C_3$-$C_8$-cycloalkylene or $C_6$-$C_{10}$-arylene-$C_1$-$C_2$-alkylene-$C_6$-$C_{10}$-arylene is preferably $C_5$-$C_6$-cycloalkylene-methylene-$C_5$-$C_6$-cycloalkylene or phenylene-methylene-phenylene, each of which may be unsubstituted or substituted in the cycloalkyl or phenyl ring by one or more methyl groups.

The radical $R_{10}$ in formula (4a) has a symmetrical or, preferably, an asymmetrical structure.

A preferred group of linking groups $L_1$ or $L_2$ comprises those of formula (4a), wherein $R_{10}$ is linear or branched $C_6$-$C_{10}$-alkylene; cyclohexylene-methylene or cyclohexylene-methylene-cyclo-hexylene each unsubstituted or substituted in the cyclohexyl moiety by from 1 to 3 methyl groups; or phenylene or phenylene-methylene-phenylene each unsubstituted or substituted in the phenyl moiety by methyl.

The bivalent radical $R_{10}$ in formula (4a) is derived preferably from a diisocyanate and most preferably from a diisocyanate selected from the group isophorone diisocyanate (IPDI), toluylene-2,4-diisocyanate (TDI), 4,4'-methylenebis(cyclohexyl isocyanate), 1,6-diisocyanato-2,2,4-trimethyl-n-hexane (TMDI), methylenebis(phenyl isocyanate), methylenebis(cyclohexyl-4-isocyanate) and hexamethylene diisocyanate (HMDI).

Another preferred group of linking groups $L_1$ or $L_2$ comprises those of formula (4b), wherein $R_{10}$ is $C_1$-$C_6$-alkylene or 1,3- or 1,4-phenylene.

Further preferred linking groups $L_1$ or $L_2$ comprise —O(O)C—, —C(O)O—, —HNC(O)—, —C(O)NH—, —OC(O)O— and HNC(O)NH—.

A preferred group of linking groups $L_3$ comprises those of formula (4b) or (4c), wherein the above meanings and preferences apply.

Suitable hydrophilic segments B are for example:

(i) non-ionic segments, for example a polyoxyalkylene, polysaccharid, polypeptide, poly(vinylpyrrolidone), polyhydroxyalkylacrylate or -methacrylate, polyacyl alkylene imine, polyacryl amide, polyvinyl alcohol, polyvinyl ether or polyol;

(ii) polyionic segments, for example a polycationic segment such as a polyallylammonium, polyethyleneimine, polyvinylbenzyltrimethylammonium, polyaniline, sulfonated polyaniline, polypyrrole or polypyridinium segment, or a polyanionic segment such as a polyacrylic or polymethacrylic acid, a polythiophene-acetic acid, a polystyrenesulfonic acid, or a zwitterionic segment. Polyionic segments in each case emcompass the free amine, imine or acid or a salt thereof.

Some examples of preferred hydrophilic segments B are a polyoxyalkylene, such as a polyethylene glycol or polypropylene glycol or a block copolymer thereof, a poly(vinylpyrrolidone), poly(hydroxyethylacrylate), poly(hydroxyethylmethacrylate), polyacrylamide, poly(N,N-dimethylacrylamide), polyacrylic or polymethacrylic acid, a polyacyl alkylene imine or a copolymeric mixture of two or more of the above-mentioned polymers.

B as a polyoxyalkylene radical may correspond, for example, to formula

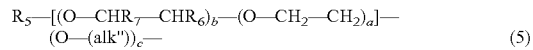

$$R_5—[(O—CHR_7—CHR_6)_b—(O—CH_2—CH_2)_a]—(O—(alk''))_c— \quad (5)$$

wherein $R_5$ in hydrogen, $C_1$-$C_{24}$-alkyl, $C_1$-$C_{24}$-alkanoyl or a radical-(alk'')-$NH_2$, one of the radicals $R_6$ and $R_7$ is hydrogen and the other is methyl, (alk'') is $C_1$-$C_6$-alkylene, c is the number 0 or 1, and each of a and b independently of the other is a number from 0 to 100, the sum of (a+b) being from 2 to 100.

In formula (5), $R_5$ is preferably hydrogen, $C_1$-$C_4$-alkyl or $C_1$-$C_4$-alkanoyl, more preferably hydrogen or $C_1$-$C_2$-alkyl and in particular hydrogen (alk'') is preferably $C_2$-$C_4$-alkylene and in particular 1,2-ethylene or 1,2- or 1,3-propylene. The variable c preferably is an integer of 0. Each of a and b independently of the others is preferably a number from 0 to 80, the sum of (a+b) being from 3 to 80. Most preferably, each of a and b independently of the others is a number from 0 to 50, the sum of (a+b) being from 4 to 50 and especially from 8 to 50. A preferred embodiment relates to polyoxyalkylene segments of formula (5) wherein b and c are each 0, $R_5$ is hydrogen, $C_1$-$C_4$-alkyl or $C_1$-$C_4$-alkanoyl, and for the variable a the above-mentioned meanings and preferences apply.

B as a polyacyl alkylene imine may correspond, for example, to a segment of formula

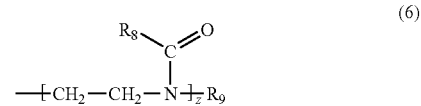

$$—[CH_2—CH_2—N]_z R_9 \quad (6)$$

wherein $R_8$ is hydrogen; $C_1$-$C_{12}$-alkyl unsubstituted or substituted by hydroxy or fluoro and/or uninterrupted or interrupted by oxygen; $C_5$-$C_8$-cycloalkyl; phenyl; or benzyl, $R_9$ is, for example, $C_1$-$C_{12}$-alkyl, benzyl, $C_2$-$C_4$-alkanoyl, benzoyl or phenyl, preferably $C_1$-$C_6$-alkyl, acetyl or benzyl and in particular $C_1$-$C_4$-alkyl, and z is an integer from 2 to 150.

$R_8$ is preferably $C_1$-$C_8$-alkyl which is unsubstituted or substituted by hydroxy or fluorine and/or is uninterrupted or interrupted by —O—; or is $C_3$-$C_8$-alkenyl. $R_8$ is more preferably $C_1$-$C_4$-alkyl, hydroxy-$C_1$-$C_4$-alkyl or trifluoromethyl and most preferably methyl. z is preferably an integer from 4 to 100, more preferably 4 to 50 and especially 5 to 20.

The mean weight average molecular weight of the hydrophilic blocks B may vary within wide limits. A preferred embodiment of the invention relates to prepolymers, particularly to prepolymers for ophthalmic uses, wherein segments B have a mean molecular weight in the range from about 200 to about 10,000, preferably in the range from about 350 to about 5000 and particularly preferably in the range from about 500 to about 1,500.

The hydrophilic blocks B are preferably linked to A or (alk) by a linking group $L_2$ of formula (4a).

Q is, for example, a crosslinkable or polymerizable group $Q_1$ or a hydrophilic segment comprising a crosslinkable or polymerizable group such as $Q_1$.

Q as a group $Q_1$ is, for example, a radical of formula

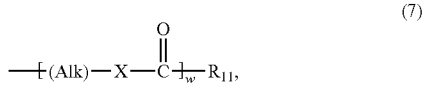 (7)

wherein (Alk) is linear or branched $C_1$-$C_{12}$-alkylene, X is —O— or —NH—, $R_{11}$ is an olefinically unsaturated copolymerisable radical having from 2 to 24 carbon atoms which may be further substituted, and w is the number 0 or 1.

Suitable substituents on the olefinic $C_2$-$C_{24}$ radical $R_{11}$ are, for example, $C_1$-$C_4$alkoxy, halogen, phenyl or carboxy. $R_{11}$ is, for example, a radical of formula

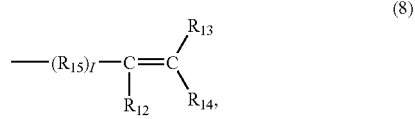 (8)

wherein l is the number 0 or 1, $R_{12}$ is hydrogen, $C_1$-$C_4$-alkyl or halogen, each of $R_{13}$ and $R_{14}$ independently of the other is hydrogen, $C_1$-$C_4$-alkyl, phenyl, carboxy or halogen, and $R_{15}$ is linear or branched $C_1$-$C_{12}$-alkylene or unsubstituted or $C_1$-$C_4$-alkyl- or $C_1$-$C_4$-alkoxy-substituted phenylene or $C_7$-$C_{12}$-aralkylene.

When $R_{15}$ is a phenylene radical, it is, for example, unsubstituted or methyl- or methoxy-substituted 1,2-, 1,3- or 1,4-phenylene. Preferably, $R_{15}$ as a phenylene radical is 1,3- or 1,4-phenylene.

When $R_{15}$ is an aralkylene radical, it is, for example, unsubstituted or methyl- or methoxy-substituted benzylene, wherein the methylene group is bonded to the amine nitrogen in each case. Preferably, Z' as an aralkylene radical is the 1,3- or 1,4-phenylenemethylene radical, wherein the methylene group is bonded to the amine nitrogen —NH— in each case.

$R_{15}$ is preferably unsubstituted or methyl- or methoxy-substituted phenylene or phenylene-methylene or $C_1$-$C_{12}$alkylene, more preferably 1,3- or 1,4-phenylene or $C_1$-$C_6$alkylene, especially $C_1$-$C_2$alkylene and most preferably methylene.

l is the number 1 or, preferably, the number 0. $R_{12}$ is preferably hydrogen, methyl or chlorine and most preferably hydrogen or methyl.

Each of $R_{13}$ and $R_{14}$ independently of the other is preferably hydrogen, carboxy, chlorine, methyl or phenyl. In a preferred embodiment of the invention, $R_{13}$ is hydrogen, chlorine, methyl or phenyl and $R_{14}$ is hydrogen or carboxy. Most preferably, $R_{13}$ and $R_{14}$ are each hydrogen.

Examples of suitable radicals $R_{11}$ are vinyl, 1-methylvinyl, 2-propenyl, allyl, 2-butenyl, o-, m- or p-vinylphenyl, styryl, 2-carboxyvinyl, 2-chloro-2-carboxyvinyl, 1,2-dichloro-2-carboxyvinyl, 1,2-dimethyl-2-carboxyvinyl and 2-methyl-2-carboxyvinyl.

Especially preferred radicals $R_{11}$ correspond to formula (8) wherein l is 0, $R_{12}$ is hydrogen or methyl, $R_{13}$ is hydrogen, methyl, chlorine or phenyl, in particular hydrogen, and $R_{14}$ is carboxy or particularly hydrogen.

Other especially preferred radicals $R_{11}$ correspond to the above formula (8) wherein l is 1, $R_{15}$ is 1,3- or 1,4-phenylene or $C_1$-$C_6$-alkylene, especially $C_1$-$C_2$-alkylene, $R_{12}$ is hydrogen or methyl and $R_{13}$ and $R_{14}$ are each hydrogen.

(Alk) is preferably $C_1$-$C_4$-alkylene, especially methylene or 1,1-dimethylmethylene.

The crosslinkable or polymerizable group $Q_1$ is preferably linked to A or (alk) by a linking group $L_1$ of formula (4a), (4c) or (4e).

One group of suitable radicals $L_1$-$Q_1$ are those wherein $L_1$ is a radical of formula (4c) wherein $X_1$ is —NH— or in particular —O—, $Q_1$ corresponds to a radical of the above formula (7) wherein w is 0, and for $R_{11}$ the above given meanings and preferences apply.

A second group of suitable radicals $L_1$-$Q_1$ are those wherein $L_1$ is a radical of formula (4c) wherein $X_1$ is —NH— or in particular —O—, $Q_1$ corresponds to a radical of the above formula (7) wherein w is 1, and for $R_{11}$ the above given meanings and preferences apply.

Still another group of suitable radicals $L_1$-$Q_1$ are those wherein $L_1$ is a radical of formula (4e) wherein $X_1$ is —NH— or in particular —O—, $X_2$ is —NH—, $Q_1$ corresponds to a radical of the above formula (7) wherein w is 1, and for $R_{11}$ the above given meanings and preferences apply.

Especially preferred radicals -$L_1$-$Q_1$ correspond to formula

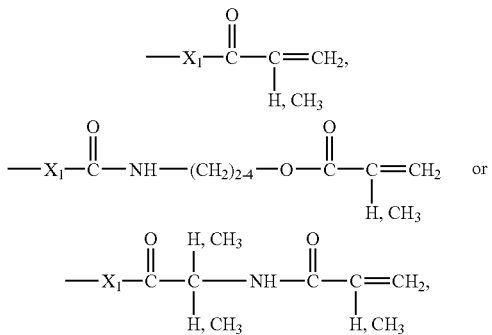

wherein $X_1$ is —O— or —NH—, in particular —O—.

Q as a hydrophilic segment comprising a crosslinkable or polymerizable C—C double bond group is, for example a polyoxyalkylene, such as a polyethylene glycol or polypropylene glycol or a block copolymer thereof, a poly(vinylpyrrolidone), poly(hydroxyethylacrylate), poly(hydroxy-ethylmethacrylate), polyacrylamide, poly(N,N-dimethylacrylamide), polyacrylic or polymethacrylic acid, a polyacyl alkylene imine or a copolymeric mixture of two or more of the above-mentioned polymers which in each case comprises one or more, preferably 1, ethylenically unsaturated bond and has a weight average molecular weight of, for example, $\geq 100$.

C—C double bond containing hydrophilic segments Q advantageously have a mean molecular weight in the range from about 200 to about 10,000, preferably in the range from about 350 to about 5000 and particularly preferably in the range from about 500 to about 1,500.

Examples of suitable C—C double bond containing hydrophilic segments Q are a radical of formula

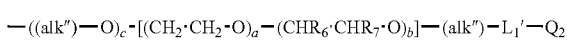 (5a)

-continued

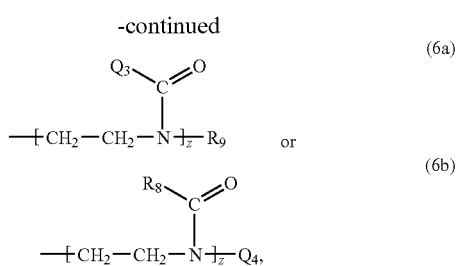

wherein for $L_1'$ and $Q_2$ each the meanings and preferences given above for $L_1$ and $Q_1$ apply, $Q_3$ is $C_3$-$C_{12}$-alkenyl or a radical —$(CH_2)_{1-4}$—O—$R_{16}$ wherein $R_{16}$ is acryloyl, methacryloyl or a group —C(O)—NH—$(CH_2)_{2-4}$—O—C(O)—C($R_{17}$)=$CH_2$ and $R_{17}$ is hydrogen or methyl, $Q_4$ is a radical of formula

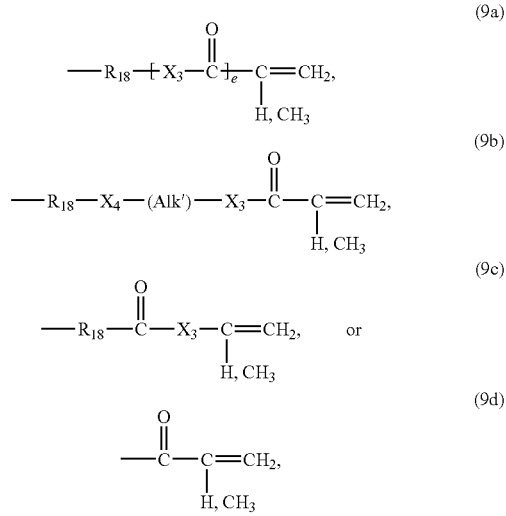

wherein $X_3$ is —O— or —NR, R is hydrogen or $C_1$-$C_4$-alkyl, $X_4$ is a group —C(O)—O—, —O—C(O)—NH— or —NH—C(O)—O—, (Alk') is $C_1$-$C_8$-alkylene, e is an integer of 0 or 1, and $R_{18}$ is $C_1$-$C_{12}$-alkylene, phenylene or $C_7$-$C_{12}$-phenylenealkylene, and for $R_6$, $R_7$, $R_8$, $R_9$, (alk"), a, b, c and z each the above-given meanings and preferences apply.

$Q_3$ in formula (6a) is preferably a radical —$(CH_2)_{2-4}$—O—$R_{16}$ wherein $R_{15}$ is acryloyl, methacryloyl or a group —C(O)—NH—$(CH_2)_2$—O—C(O)—C($R_{17}$)=$CH_2$, and $R_{17}$ is hydrogen or methyl.

Preferred meanings of the variables contained in formulae (9a)-(9d) are:

R is preferably methyl, ethyl or, in particular, hydrogen, $X_3$ in formula (9a) is preferably —O— or —NH—. $X_3$ in formula (9b) is preferably —NH—. $X_3$ in formula (9c) is preferably —O—. $X_4$ is preferably the radical —NH—C(O)—O—. $R_{18}$ is preferably $C_1$-$C_6$-alkylene or benzyl and more preferably $C_1$-$C_4$-alkylene or benzyl, and most preferably methyl, ethyl or benzyl. (Alk') is preferably $C_2$-$C_6$-alkylene and in particular $C_2$-$C_4$-alkylene. e is preferably the number 1.

Some examples of suitable radicals $Q_4$ are o-, m- or p-vinylbenzyl, allyl, acryloyl-$C_1$-$C_4$-alkyl, in particular acryloylethyl, methacryloyl-$C_1$-$C_4$-alkyl, in particular methacryloylethyl, acrylamido-$C_1$-$C_4$-alkyl, in particular acrylamidoethyl, methacrylamido-$C_1$-$C_4$-alkyl, in particular methacrylamidoethyl, vinyloxycarbonyl-$C_1$-$C_4$-alkyl, in particular vinyloxycarbonylmethyl or vinyloxycarbonylethyl, and vinylcarbonyl.

Q as a hydrophilic block comprising an ethylenically unsaturated group is preferably linked to A or (alk) by a linking group $L_1$ of formula (4a).

(alk) is preferably $C_2$-$C_{12}$-alkylene, more preferably $C_3$-$C_{10}$-alkylene and most preferably $C_4$-$C_8$-alkylene, which is in each case unsubstituted or substituted by hydroxy. (alk) is preferably linked to A by a linking group $L_3$ of formula (4a) or (4c).

The amphiphilic block copolymers of the invention wherein t is 0 and $L_1$ and $L_2$ are each a linking group of formula (4a) or (4b) may be prepared, for example, by reacting in any order a compound of formula

about (p+q) molar equivalents of a compound of formula

about p molar equivalents of a compound of formula

and about q molar equivalents of a compound of formula

each, wherein Y is a group —N=C=O or carboxy or a suitable derivative thereof, for example a group —C(O)OH, —C(O)O$R_{19}$ or —C(O)—OHal wherein $R_{19}$ is, for example, $C_1$-$C_4$-alkyl, phenyl or benzyl and Hal is halogen, in particular bromine or chlorine, $X_2'$ independently has the meaning of $X_2$, and A, B, $X_1$, $X_2$, p and q are as defined above.

For example, the compounds of formulae (12) and (13) may be first reacted with about one molar equivalent of a compound of formula (11) each, and the intermediates obtained are then reacted with the compound of formula (10). Another synthetic route comprises first reacting a compound of formula (10) with a compound of formula (11), and the intermediate obtained is then reacted with a mixture of the compounds of formulae (12) and (13).

Where the compound of formula (11) is a carboxylic acid or a derivative thereof, e.g. a carboxylic acid halide, the reaction thereof with the components of formulae (10), (12) and (13), respectively, can be carried out under the conditions that are customary for ester, thioester, or amide formation, for example at temperatures of, for example, from −40 to 80° C., preferably from 0 to 50° C. and most preferably from 0 to 25° C., in a dipolar aprotic solvent, e.g. tetrahydrofuran, dioxane, DMSO or an aprotic solvent as mentioned below, or in a mixture of water and one of the mentioned solvents, in the presence of a base, e.g. an alkali metal hydroxide, and, where applicable, in the presence of a stabiliser. Suitable stabilisers are, for example, 2,6-dialkylphenols, hydroquinone derivatives, e.g. hydroquinone or hydroquinone monoalkyl ethers, or N-oxides, e.g. 4-hydroxy-2,2,6,6-tetramethyl-piperidin-1-yl. The reaction times may vary within wide limits, a period of, for example, from 30 minutes to 12 hours, preferably from 1 to 6 hours and especially from 2 to 3 hours, generally having been found practicable.

Where the compound of formula (11) is an isocyanate, the reaction thereof with the components of formulae (10), (12) and (13), respectively, can be carried out under the conditions that are customary for the formation of urethanes or ureas. In case of urethane formation it is advantageously to perform the reaction in an inert solvent. Amines of the formual (10), (12) and (13) may be reacted with the diisocyanate of formula (11) also in an aqueous medium. It is especially advantageous to use diisocyanates having isocyanate groups of differing reactivity since the formation of isomers and diadducts can thereby be substantially suppressed. The differing reactivity can be brought about, for example, by steric hindrance.

Suitable inert solvents for the reaction of the compounds, of formulae (10), (12) or (13) with a compound of formula (11) are aprotic, preferably polar, solvents, for example hydrocarbons (petroleum ether, methylcyclohexane, benzene, toluene, xylene), halogenated hydrocarbons (chloroform, methylene chloride, trichloroethane, tetrachloroethane, chlorobenzene), ethers (diethyl ether, dibutyl ether, ethylene glycol dimethyl ether, diethylene glycol dimethyl ether, tetrahydrofuran, dioxane), ketones (acetone, dibutyl ketone, methyl ethyl ketone, methyl isobutyl ketone), carboxylic acid esters and lactones (ethyl acetate, butyrolactone, valerolactone), alkylated carboxylic acid amides (N,N-dimethylacetamide, N-methylpyrrolidone), nitriles (acetonitrile), sulfones and sulfoxides (dimethyl sulfoxide, tetramethylenesulfone). Polar solvents are preferably used. The reaction temperature may be, for example, from −40 to 200° C. When catalysts are used, the temperatures may advantageously be in the range of from 0 to 50° C., preferably at room temperature. Suitable catalysts are, for example, metal salts, such as ferric chloride or alkali metal salts of carboxylic acids, tertiary amines, for example $(C_1-C_6 alkyl)_3 N$ (triethylamine, tri-n-butylamine). N-methylpyrrolidine, N-methylmorpholine, N,N-dimethylpi-peridine, pyridine and 1,4-diaza-bicyclooctane. Tin salts have been found to be especially effective, especially alkyltin salts of carboxylic acids, for example dibutyltin dilaurate and tin dioctoate. The isolation and purification of the compounds prepared is carried out according to known methods, for example by means of extraction, crystallisation, recrystallisation or chromatographic purification methods.

The amphiphilic block copolymers of the invention wherein t is 0 and $L_1$ and $L_2$ are each a linking group of formulae (4c), (4d) or (4e) may be prepared, for example, by reacting a compound of the formula $$A-(Y)_{p+q} \tag{10a}$$

with about p molar equivalents of a compound of the above formula (12) and q molar equivalents of a compound of formula (13), or by reacting a compound of the above formula (10) with about p molar equivalents of a compound of formula $$Q-Y \tag{12a}$$

and about q molar equivalents of a compound of formula $$B-Y \tag{13a},$$

wherein A, B, Q, Y, p and q each have the above-mentioned meaning.

The reaction of the components of formulae (10a) and (12) and (13) or (10) and (12a) and (13a), respectively, can be carried out under the conditions that are customary for ester, thioester, amide, urethane or urea formation, for example as outlined above.

The amphiphilic block copolymers of the invention wherein p and q are each 0 and $L_1$ and $L_2$ are each a linking group of formula (4a), (4b), (4c) or (4e) may be prepared, for example, by reacting a compound of formula

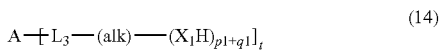

with (i) about p1 molar equivalents of a compound of formula (12a) or the reaction product of a compound of formula (11) and (12); and
(ii) about q1 molar equivalents of a compound of formula (13a) or the reaction product of a compound of formula (11) and (13), wherein A, $L_3$, $X_1$, (alk), p1 and q1 are each as defined above.

The reactions can be carried out under the conditions that are customary for ester, thioester, amide, urethane or urea formation, for example as outlined above. A linking group $L_1$ or $L_2$ of formula (4d) in the above amphiphilic block copolymers may be prepared, for example, by reacting a compound which is analogous to the compound of formula (14) but contains a carboxy group or an above-mentioned derivative thereof with a compound of formula (12) or (13).

The compounds of formula (14) are known or may be prepared according to processes known in the art, for example by reacting a compound $A-(X_1H)_t$ with a compound $Y_1-(alk)-(X_1'H)_{p1+q1}$ or

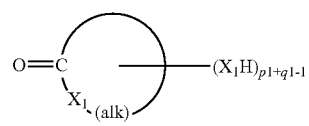

wherein $X_1'$ independently has the meaning of $X_1$, $Y_1$ is carboxy or an above-mentioned derivative thereof, and $X_1$, (alk), p1 und q1 each have the above-mentioned meaning.

The molecular weight of the copolymers of the invention is, within wide limits, not critical. Preferably, however, the prepolymer has a weight average molecular weight of from approximately 1400 to 200000, preferably from 2000 to 100000 and more preferably from 2500 to 50000 and most preferably from 3000 to 25000.

The amphiphilic block copolymers of formula (1) are crosslinkable, but are uncrosslinked or, at least, substantially uncrosslinked; in addition, they are stable, that is to say spontaneous crosslinking as a result of homopolymerisation does not take place.

The amphiphilic block copolymers of formula (1) according to the invention are crosslinkable in a controlled and extremely effective manner, especially by photo-crosslinking.

The present invention further relates, therefore, to a polymer that can be obtained by photo-crosslinking of a amphiphilic block copolymers of formula (1), in the presence or, preferably, in the absence of an additional vinyl comonomer. These crosslinked polymers are water-insoluble.

In the photo-crosslinking, a photoinitiator capable of initiating free-radical crosslinking is suitably added. Examples thereof will be familiar to the person skilled in the art, suitable photoinitiators that may specifically be mentioned being benzoin methyl ether, 1-hydroxycyclohexylphenyl ketone, Darocure 1173 or Irgacure types. The crosslinking can then be brought about by actinic radiation, e.g. UV light, or ionising radiation, e.g. gamma rays or X-rays. The amount of photoinitiator may be selected within wide limits, an amount of up to 0.05 g/g of polymer and especially of up to 0.01 g/g of polymer having proved beneficial.

The amphiphilic block copolymers of formula (1) is introduced into the crosslinking process preferably in pure form, particularly substantially free from undesired constituents, such as, for example, free from monomeric, oligomeric or polymeric starting compounds used for the preparation of the copolymer, and/or free from secondary products formed during the preparation of the copolymer. Said copolymers in pure form are obtained advantageously by previously purifying them in a manner known per se, for example by precipitation with a suitable solvent, filtration and washing, extraction in a suitable solvent, dialysis, reverse osmoses (RO) or ultrafiltration, reverse osmoses and ultrafiltration being especially preferred.

The preferred purification processes for the copolymers of the invention, reverse osmoses and ultrafiltration, can be carried out in a manner known per se It is possible for the ultrafiltration and reverse osmoses to be carried out repeatedly, for example from two to ten times. Alternatively, the ultrafiltration and reverse osmoses can be carried out continuously until the selected degree of purity is attained. The selected degree of purity can in principle be as high as desired.

The copolymers of formula (1) may be crosslinked, for example, in form of a solution or a mesophase.

One embodiment of the invention relates to the photopolymerisation of the block copolymers of the invention in solution, preferably in one or more different organic solvents. Suitable solvents are in principle all solvents that dissolve the polymers according to the invention and an optional vinyl comonomer which may be additionally used, e.g. alcohols, such as $C_1$-$C_6$-alkanols, e.g. n- or iso-propanol, ethanol or methanol, carboxylic acid amides, such as dimethylformamide, or dimethyl sulfoxide, and mixtures of suitable solvents, e.g. mixtures of water with an alcohol, e.g. a water/propanol, water/ethanol or a water/methanol mixture.

According to this embodiment of the invention, the photo-crosslinking is preferably effected from a solution comprising (i) one or more prepolymers according to the invention which can be obtained as a result of the preferred purification step, ultrafiltration, (ii) one or more solvents selected from the group consisting of a $C_1$-$C_6$-alkanol, a carboxylic acid amide, dimethyl sulfoxide and water, and optionally (iii) an additional vinyl comonomer. For example, photo-crosslinking of the block copolymers is carried out in ethanol or n- or iso-propanol.

The vinyl comonomer that can additionally be used according to the invention in the photo-crosslinking may be hydrophilic or hydrophobic or may be a mixture of a hydrophobic and a hydrophilic vinyl monomer. Suitable vinyl monomers include especially those which are customarily used in the manufacture of contact lenses. The expression "hydrophilic vinyl monomer" is understood to mean a monomer that typically produces as homopolymer a polymer that is water-soluble or capable of absorbing at least 10% by weight water. Analogously, the expression "hydrophobic vinyl monomer" is understood to mean a monomer that typically produces as homopolymer a polymer that is water-insoluble or capable of absorbing less than 10% by weight water.

The proportion of vinyl comonomers, if used, is preferably from 0.5 to 80 units per copolymer of formula (1), especially from 1 to 30 units of vinyl comonomer per copolymer unit of formula (1) and most preferably from 5 to 20 units per copolymer of formula (1).

It is also preferred to use a hydrophobic vinyl comonomer or a mixture of a hydrophobic vinyl comonomer with a hydrophilic vinyl comonomer, the mixture containing at least 50% by weight of a hydrophobic vinyl comonomer. In that manner, the mechanical properties of the polymer can be improved without the water content being appreciably reduced. In principle, however, both conventional hydrophobic vinyl comonomers and conventional hydrophilic vinyl comonomers are suitable for copolymerisation with a prepolymer of formula (1).

Suitable hydrophobic vinyl comonomers include, without the following being an exhaustive list, $C_1$-$C_{18}$alkyl acrylates and methacrylates, $C_3$-$C_{18}$alkylacrylamides and -methacrylamides, acrylonitrile, methacrylonitrile, vinyl-$C_1$-$C_{18}$alkanoates, $C_2$-$C_{18}$alkenes, $C_2$-$C_{18}$haloalkenes, styrene, $C_1$-$C_6$alkylstyrene, vinyl alkyl ethers in which the alkyl moiety has from 1 to 6 carbon atoms, $C_2$-$C_{10}$perfluoroalkyl acrylates and methacrylates or correspondingly partially fluorinated acrylates and methacrylates, $C_3$-$C_{12}$perfluoroalkyl-ethyl-thiocarbonylaminoethyl acrylates and methacrylates, acryloxy- and methacryloxy-alkylsiloxanes, N-vinylcarbazole, $C_1$-$C_{12}$alkyl esters of maleic acid, fumaric acid, itaconic acid, mesaconic acid and the like. Preferred are, for example, $C_1$-$C_4$alkyl esters of vinylically unsaturated carboxylic acids having from 3 to 5 carbon atoms or vinyl esters of carboxylic acids having up to 5 carbon atoms.

Examples of suitable hydrophobic vinyl comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthio-carbonylaminoethyl methacrylate, isobornyl methacrylate, trifluoroethyl methacrylate, hexa-fluoroisopropyl methacrylate, hexafluorobutyl methacrylate, tris-trimethylsilyloxy-silyl-propyl methacrylate, 3-methacryloxypropylpentamethyldisiloxane and bis(methacryloxypropyl)-tetramethyldisiloxane.

Suitable hydrophilic vinyl comonomers include, without the following being an exhaustive list, hydroxy-substituted lower alkyl acrylates and methacrylates, acrylamide, methacrylamide, lower alkylacrylamide and -methacrylamide, ethoxylated acrylates and methacrylates, hydroxy-substituted lower alkylacrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-lower alkylamino- or di-lower alkylamino-lower alkyl acrylates and methacrylates, allyl alcohol and the like. Preferred are, for example, hydroxy-substituted $C_2$-$C_4$alkyl (meth)acrylates, five- to seven-membered N-vinyl lactams, N,N-di-$C_1$-$C_4$alkyl(meth)-acrylamides and vinylically unsaturated carboxylic acids having a total of from 3 to 5 carbon atoms.

Examples of suitable hydrophilic vinyl comonomers include hydroxyethyl methacrylate, hydroxyethyl acrylate, acrylamide, methacrylamide, dimethylacrylamide, allyl alcohol, vinyl-pyridine, vinylpyrrolidine, glycerol methacrylate, N-(1,1-dimethyl-3-oxobutyl)-acrylamide and the like.

Preferred hydrophobic vinyl comonomers are methyl methacrylate and vinyl acetate. Preferred hydrophilic vinyl comonomers are 2-hydroxyethyl methacylate, N-vinylpyrrolidone and acrylamide. Most preferably, the crosslinking of the copolymers of formula (1) is carried out in the absence of a vinylic comonomer.

According to another preferred embodiment of the invention, the copolymers of formula (1) are previously converted into a mesophase which is at least partly bicontinuous, and the mesophase is then subjected to photocrosslinking. A suitable process producing a mesophase composition is disclosed in PCT patent application WO 99/12059, which application is herein incorporated by reference.

The term mesophase in this context is to be understood as meaning a thermodynamically stable mixture of an amphiphilic substance such as a crosslinkable block copolymer of formula (1) and an aqueous solution or a melt of an above-mentioned crosslinkable amphiphilic block copolymer which shows in each case a self-assembled microstructure. Mesophases are typically homogeneous and optical transparent mixtures which lie in single phase regions of the phase diagram of the components the system is based on. These single phases may be of a liquid crystalline nature (such as lamellar, hexagonal or cubic) which indicates an ordered compartmentisation of components in the mixture with a geometrically regular and repeated structure, or may be of a non-crystalline nature in which compartmentisation is random and isotropic. An example for this latter type of mesophases is represented by microemulsions. Accordingly, many microstructures can occur within the general class of mesophases. Within the present invention, mesophases having a liquid crystalline microstructure are preferred. The mesophases of the claimed process thus preferably lie in single phase regions of the phase diagram that exhibit a crystalline structure and most preferably a cubic structure.

In addition, the mesophases of this embodiment are at least partly bicontinuous, that is to say the mixture has at least two partly bicontinuous phases, for example an oxygen-permeable and an ion-permeable phase, which are intermingled.

A "phase", as used herein, refers to a region of substantially uniform composition which is a distinct and physically separate portion of a heterogeneous polymeric material. However, the term "phase" does not imply that the material described is a chemically pure substance, but merely that certain bulk properties differ significantly from the properties of another phase within the material. Thus, with respect to the polymeric components of an ophthalmic molding such as a lens, an ion-permeable phase refers to a region composed of essentially only ion-permeable polymer (and water, when hydrated), while an oxygen-permeable phase refers to a region composed of essentially only oxygen-permeable polymer (and perhaps a small amount of water, when hydrated).

"Bicontinuous phases", as used herein, refers to at least two regions, each of substantially uniform composition which differs from the other, and each of which exhibiting its individual properties. With respect to ophthalmic moldings such as contact lenses it has been found that it is highly desirable to have bicontinuous phases of an oxygen-permeable polymer and an ion-permeable polymer which provide the lens with two continuous pathways or sets of continuous pathways extending from the inner surface of the lens to the outer surface of the lens. Said at least two continuous pathways ensure that the lens material has both a high oxygen transmissibility and ion or water permeability.

The mesophases may be prepared from a melt of one or more than one different copolymers of formula (1) and optionally further components or, preferably, from (i) one or more than one different copolymers of formula (1), (ii) an aqueous solution and optionally (iii) further components.

(ii) Aqueous Solution

The aqueous solution that is added to form the mesophase may be pure water or a mixture of water and one or more water-miscible solvents and/or salts.

(ii-a) Water-miscible Organic Solvents

Examples of suitable solvents that may be added to the mesophase are a monohydric or polyhydric alcohol, for example a $C_1$-$C_8$ alcohol such as n-butanol, n-propanol, ethanol or methanol or a polyhydric alcohol such as glycerol or a glycol; a polyether such as Butyl Cellosolve™, Butyl Carbitol™, Hexyl Cellosolve™, or Hexyl Carbitol™, a carboxylic acid amide, for example N,N-dimethylformamide; acetone, acetonitrile; dimethyl sulfoxide; or mixtures thereof. Preferably, the aqueous solution does not comprise any additional organic solvent or comprises a $C_1$-$C_4$ alcohol, for example ethanol or methanol as additional organic solvent. In a particularly preferred embodiment of the invention, the aqueous solution does not comprise an additional organic solvent.

(ii-b) Salts

Salts that may be comprised in the aqueous solution used to form the inventive mesophases include without limitation thereto physiologically tolerable salts, such as buffer salts customary in the field of contact lens care, for example phosphate salts, or isotonising agents customary in the field of contact lens care, such as alkali halides, for example sodium chloride, or mixtures thereof.

If salts are added, the aqueous salt solution has for example an osmolarity of from about 200 to 450 milliosmol in 1000 ml (unit: mOsm/l), preferably an osmolarity of from about 250 to 350 mOsm/l, and in particular about 300 mOsm/l.

An example of an especially suitable aqueous salt solution of the invention is an artificial, preferably buffered, lacrimal fluid that in respect of pH value and osmolarity is adapted to natural lacrimal fluid, for example, a sodium chloride solution that is unbuffered or that is preferably buffered, for example, by a phosphate buffer, and that has an osmolarity that corresponds to the osmolarity of human lacrimal fluid.

The aqueous solution employed for the formation of the mesophases of the invention is preferably a pure solution which means a solution which is free or essentially free from undesired constituents. Especially preferred examples of such solutions are pure water or an artificial lacrimal fluid, as defined hereinbefore.

(iii) Optional Further Components

Optional further components which are used for the preparation of the mesophases, besides the crosslinkable block copolymer of formula (1) and the aqueous solution, are for example: (iii-a) a photoinitiator, for example one of the photoinitiators mentioned above; (iii-b) a surfactant which may be any conventional non-ionic, cationic or zwitterionic surfactant known in the art; (iii-c) a hydrophobic or hydrophilic comonomer wherein the above given meanings and preferences apply; or (iii-d) a pharmaceutical effective agent, for example a protein, enzyme, vitamin, disinfectant, bactericide or the like.

The mesophases of the present invention may be prepared by simply admixing suitable amounts of the copolymer of formula (1), the aqueous solution and optionally further components in any order at a temperature of, for example, 0 to 100° C., preferably 10 to 50° C., and more preferably 15 to 40° C. The mesophases may form spontaneously or upon stirring and/or standing for a suitable period. For example, the components that make up the mesophase are mixed for about 1 minute to 1 week, preferably for 30 minutes to 5 days and most preferably 2 hours to 3 days, in order to form a mesophase which is ready for being further processed according to the invention.

According to another embodiment of the invention, a mesophase may be obtained by simply preparing a melt of the copolymer and optionally further components in the absence of an aqueous solution which is especially suited for prepolymers having a low melting or glass transition point.

The mesophases of the invention comprise, for example, from 10 to 100 percent by weight of copolymer(s) of formula (1), from about 0 to about 90 percent by weight of aqueous solution and from 0 to 40 percent by weight of further components. Preferably, the bicontinuous mesophases of the invention comprise from about 30 to about 85 percent by weight of copolymer(s) of formula (1), from about 15 to about 70 percent by weight of aqueous solution and from 0 to 10 percent by weight of further components. Particularly preferred mesophases comprise from 30 to 75 percent by weight of copolymer(s) of formula (1) and from 25 to 70 percent by weight of aqueous solution.

The solutions or mesophases comprising a block copolymer of formula (1) may be processed in a manner known per se to form moldings, especially contact lenses, for example by carrying out the photo-crosslinking of the copolymers of the invention in a suitable mold, in particular a contact lens mold. For example, the solution or mesophase is introduced into an opthalmic mold in a manner known per se, such as, especially, by conventional metering in, for example by dropwise introduction or by extrusion. Suitable molds are generally customary contact lens molds as known in the state of the art. Thus, the contact lenses according to the invention can be manufactured, for example, in a manner known per se, for example in a conventional "spin-casting mold", as described, for example, in U.S. Pat. No. 3,408,429, or by the so-called Full-Mould process in a static mold, as described, for example, in U.S. Pat. No. 4,347,198. Appropriate molds are made, for example, from polypropylene. Quartz, sapphire glass and metals, for example, are suitable materials for reusable molds.

The crosslinking can be triggered in the mold, for example by actinic radiation, such as, for example, UV light, or by ionising radiation, such as, for example, gamma radiation, electron radiation or X radiation. The crosslinking can where appropriate also be triggered thermally or electrochemically. Attention is drawn to the fact that the photocrosslinking can be carried out in a very short time, for example in $\leq 60$ minutes, preferably $\leq 20$ minutes, more preferably $\leq 5$ minutes even more preferably in $\leq 1$ minute, especially in up to 30 seconds, especially preferably, as disclosed in the examples.

The opening of the mold such that the molding can be removed from the mold can be carried out in a manner known per se.

The moldings obtainable from the block copolymers of formula (1) are preferably at least partly bicontinuous, that is to say the moldings, as stated before, have at least two partly bicontinuous phases, for example an oxygen-permeable and an ion-permeable phase, which are intermingled.

The invention further relates, therefore, to moldings that comprise or, preferably, substantially consist of a crosslinked block copolymer of formula (1). Further examples of moldings of the invention, apart from contact lenses, are biomedical or special ophthalmic moldings, e.g. intraocular lenses, artificial cornea, eye dressings, moldings for use in surgery, such as heart valves, artificial arteries or the like, and films or membranes, e.g. membranes for controlling diffusion, photostructurable films for information storage, or photoresist materials, e.g. membranes or moldings for etch resists or screen print resists.

If the molding manufactured according to the invention is a contact lens and the latter has been manufactured under solventless conditions from a previously purified prepolymer of the invention, then it is normally unnecessary for the removal of the molding to be followed by purification steps, e.g. extraction, because the prepolymers used do not contain any undesired low-molecular-weight constituents; consequently, the crosslinked product also is free or substantially free of such constituents and subsequent extraction can be dispensed with. The contact lens can accordingly be converted into a ready-for-use contact lens directly in conventional manner by hydration. Suitable forms of hydration capable of producing ready-for-use contact lenses with a wide variety of water contents are known to the person skilled in the art. The contact lens is swelled, for example, in water, in an aqueous salt solution, especially in an aqueous salt solution having an osmolarity of approximately from 200 to 450 milliosmol in 1000 ml (unit: mosm/l), preferably approximately from 250 to 350 mosm/l and especially approximately 300 mosm/l, or in a mixture of water or an aqueous salt solution with a physiologically tolerable polar organic solvent, for example glycerol. Swelling of the prepolymer in water or in aqueous salt solutions is preferred.

The aqueous salt solutions used for the hydration are advantageously solutions of physiologically tolerable salts, such as buffer salts customary in the field of contact lens care, e.g. phosphate salts, or isotonising agents customary in the field of contact lens care, such as, especially, alkali metal halides, e.g. sodium chloride, or solutions of mixtures thereof. An example of an especially suitable salt solution is a synthetic, preferably buffered, lachrymal fluid that has been matched to natural lachrymal fluid with regard to pH value and osmolarity, e.g. an unbuffered or preferably buffered, for example phosphate buffer-buffered, sodium chloride solution the osmolarity and pH value of which correspond to the osmolarity and pH value of human lachrymal fluid.

The hydration fluids defined above are preferably pure, that is to say free or substantially free of undesired constituents. Most preferably, the hydration fluid is pure water or a synthetic lachrymal fluid as described above.

If the molding manufactured according to the invention is a contact lens and the latter has been manufactured from an aqueous mesophase of a previously purified copolymer of the invention, the crosslinked product also will not contain any troublesome impurities. There is normally no need, therefore, for subsequent extraction. Since the crosslinking is carried out in an aqueous medium, there is also no need for subsequent hydration. In accordance with an advantageous embodiment, therefore, the contact lenses obtainable by this process are distinguished by the fact that they are suitable for use as intended without extraction or hydration. The expression "use as intended" is understood in this context to mean especially that the contact lenses can be inserted into the human eye.

The copolymers of the invention are especially suitable for the manufacture of mass-produced articles, such as, for example, contact lenses that are worn for a short time, for example for a month, a week or just one day, and are then replaced by new lenses. This is in particular because contact lenses prepared from a mesophase of the copolymers can be used for their intended use without subsequent treatment steps, such as extraction or hydration. The copolymers of the invention are further useful for the manufacture of biomedical devices of all kinds, for example ophthalmic moldings such as intraocular lenses or artificial cornea, wound healing dressings, eye bandages, materials for the sustained release of an active compound such as a drug delivery patch, moldings that can be used in surgery, such as heart valves, vascular grafts, catheters, artificial organs, encapsulated biological implants, e.g. pancreatic islets, materials for prostheses such as bone substitutes, or moldings for diagnostics, membranes or biomedical instruments or apparatus.

In addition, biomedical devices, for example ophthalmic moldings such as in particular contact lenses obtainable according to the invention have a range of unusual and extremely advantageous properties and are therefore suited to extended periods of wear (true extended wear, i.e., seven days or more). Among these properties are, for example, their excellent compatibility with the human cornea and with tear fluid, which is based on a balanced ratio between water content, oxygen permeability, ion permeability and mechanical and absorptive properties.

In particular, moldings obtainable from a block copolymer of the invention do have a high surface wettability which can be demonstrated by their contact angles, their water retention and their water-film break up time or tear film break up time (TBUT).

The TBUT plays an particularly important role in the field of ophthalmic devices such as contact lenses. Thus the facile movement of an eyelid over a contact lens has proven important for the comfort of the wearer; this sliding motion is facilitated by the presence of a continuous layer of tear fluid on the contact lens, a layer which lubricates the tissue/lens interface. An increased wettability of the surface furthermore contributes substantially to low microbial adhesion and resistance to deposit formation.

The above outlined properties of the novel copolymers impart a high comfort and the absence of irritation and allergenic effects to biomedical moldings derived therefrom. Owing to their favourable permeability properties with respect to gases ($CO_2$ and $O_2$), various salts, nutrients, water and diverse other components of tear fluid, the contact lenses prepared according to the process of the invention have no effect, or virtually no effect, on the natural metabolic processes in the cornea. Furthermore, the contact lenses obtainable according to the process are optical clear and transparent, have a high shelf life and good mechanical properties, for example concerning the modulus of elasticity, elongation at break or dimensional stability.

All of the advantages mentioned above, in particular those concerning the surface wettability, apply to moldings derived from an amphiphilic block copolymer of the invention per se, that is to say without any subsequent surface treatment, e.g. coating. The block copolymers of the invention thus may be processed directly to biomedical moldings, in particular ophthalmic moldings, without any subsequent surface treatment, e.g. coating, whereas known polymeric materials in general have to be coated with an hydrophilic coating in order to be useful as a biomedical molding that comes in direct contact with the human body.

The above-mentioned advantages apply, of course, not only to ophthalmic moldings such as contact lenses but also to other moldings of the invention. The sum of the various advantageous aspects in the manufacture of the moldings of the invention results in the moldings of the invention being especially suitable as mass-produced articles, such as, for example, contact lenses that are worn for a short period and then replaced by new lenses.

In the Examples which follow, amounts are by weight, unless specified otherwise, and temperatures are given in degrees Celsius. Dynamic contact angle measurements are obtained using the dynamic Wilhelmy plate method, that is the wetting force on the solid is measured as the solid is immersed in or withdrawn from a liquid of known surface tension.

Example 1 a) 11.8 g (15.5 mmol) poly(ethyleneglycol) mono-methyl ether, $M_n$ 750(PEG750) are dissolved in 13.8 g anhydrous dichloroethane (DCE) in a round-bottomed flask. The PEG750 is dried by refluxing the water/DCE azeotrope through molecular sieves in a Soxhlet funnel. After drying, the contents of the flask is cooled, and 10.2 g (45.8 mmol) isophoronediisocyante (IPDI) are then added to the flask, along with 100 mg dibutyltin dilaurate (DBTDL). The contents are mixed overnight at room temperature. The solution is poured into a separatory funnel and the excess IPDI extracted with anhydrous hexane. The waxy-liquid PEG (750)-IPDI product is drained into a RBF and solvent removed under vacuum. The product is stored under vacuum over a weekend, then under nitrogen.

(b) In a three-necked round-bottomed flask are dissolved 8.0 g (1.4 mmol) of the compound of formula

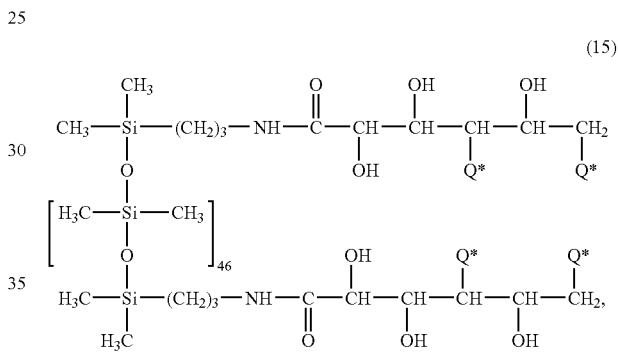

(15)

wherein Q* is a radical —O—C(O)—NH—$(CH_2)_2$—O—C(O)—C($CH_3$)=$CH_2$ (synthesis see PCT application WO 96/36890) in 30 g anhydrous dichloroethane. To this solution are added 4.1 g (4.1 mmol) of the PEG(750)-IPDI. The flask is equipped with a condenser, a thermometer, stir bar, and heating mantle. The mixture is stirred and heated to 45° C. DBTDL catalyst is added, and dry air is infused through the system. After 7 days, no isocyanate peak is visible in the IR, and the solution is then cooled. The solvent is removed via rotary evaporation to yield 10.2 g of a product corresponding to the above formula (15), wherein 3 hydroxy groups have been substituted by a radical of formula

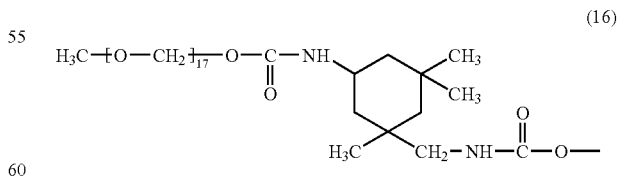

(16)

c) 0.8109 g of the product obtained according to step b) are mixed with 0.2 g water containing 0.01% of a photoinitiator (Darocur® 2959). This mixture is centrifuged, refrigerated overnight, mixed, and recentrifuged until the formulation looks homogeneous and transparent. This formulation is cast on quartz plates that had been soaked overnight in KOH/ isopropanol, rinsed with ethanol, then rinsed with purified water and air dried. The films are cured for 90 seconds under a UV lamp, and extracted with an isopropanol/water mixture. Dynamic contact angle measurements are obtained which indicate a high surface wettability of the films.

Example 2 a) 15.0 g (7.8 mol) poly(ethyleneglycol) mono-methyl ether, $M_n$ 1900 (PEG1900) is dissolved in 20 g anhydrous dichloromethane in a round-bottomed flask. The PEG1900 is dried by refluxing the water/dichloromethane azeotrope through molecular sieves in a Soxhlet funnel. After drying, the contents of the flask are cooled, and 5.3 g (24.0 mmol) isophoronediisocyante (IPDI) are added to the flask, along with 100 mg dibutylin dilaurate (DBTDL). The contents are mixed over the weekend at room temperature. The solution is poured into a separatory funnel and the excess IPDI extracted with anhydrous hexane. The PEG-IPDI product is drained into a RBF and solvent removed under vacuum. The product is stored under vacuum.

b) In a round-bottomed flask are dissolved 5.03 g (0.13 mmol) of a compound of formula

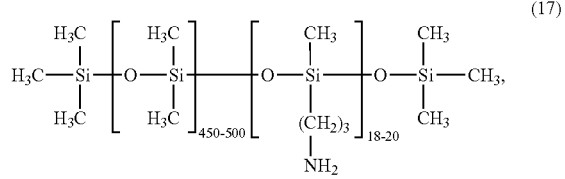

(17)

in 10.4 g anhydrous dichloroethane (DCE). To this solution are added 1.9 g (1.9 mmol) of the PEG(1900)-IPDI product according to step a) dissolved in 10.2 g anhydrous DCE. The mixture is stirred at room temperature under nitrogen for 3.5 hours. Then 0.26 g (1.7 mmol) of isocyanatoethyl methacrylate are added to the mixture, which is stirred under infused dry air a few hours, until the isocyanate peak is no longer visible in the IR. The solvent is then removed via rotary evaporation to yield a product of the above formula (17), wherein about 35% of the amino groups are substituted by a radical of formula

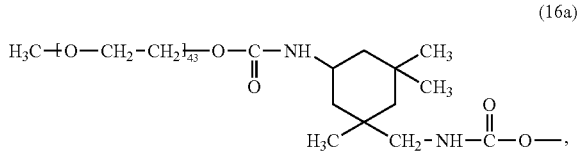

(16a)

and the remaining amino groups are substituted by a radical
—O—C(O)—NH—(CH$_2$)$_2$—O—C(O)—C(CH$_3$)═CH$_2$.

c) 1.51 g of the product obtained according to step b) are mixed with 1.51 g ethanol and 7.5 mg of a photoinitiator (Darocur® 1173). This mixture is stirred to dissolve, degassed, and cast in a dry box on quartz plates that has been soaked overnight in KOH/isopropanol, rinsed with ethanol, then rinsed with purified water and air dried. The flats are cured for 15 minutes under a UV lamp, and extracted with an isopropanol/water mixture. Dynamic contact angle measurements are obtained which indicate a high surface wettability of the flats.

Example 3

(a) 11.8 g (15.5 mmol) poly(ethyleneglycol) mono-methyl ether (PEG750) are dissolved in 13.8 g anhydrous dichloroethane (DCE) in a round-bottomed flask. The PEG750 is dried by refluxing the water/DCE azeotrope through molecular sieves in a Soxhlet funnel. After drying, the contents of the flask are cooled, and 10.2 g (45.8 mmol) isophoronediisocyanate (IPDI) are added to the flask, along with 100 mg dibutyltin dilaurate (DBTDL). The contents are mixed overnight at room temperature. The solution is poured into a separatory funnel and the excess IPDI extracted with anhydrous hexane. The waxy-liquid PEG(750)-IPDI product is drained into a RBF and solvent removed under vacuum. The product is stored under vacuum over a weekend, then under nitrogen.

b) To a three-necked round-bottomed flask are added 0.87 g (4.88 mmol) D(+) gluconic acid-δ-lactone, and 21 ml anhydrous tetrahydrofuran. The flask is equipped with a condenser, a thermometer, stir bar, and heating mantle. An addition funnel containing 10.00 g (0.26 mmol) of the compound of formula (17) according to Example 2 is also attached, and dry nitrogen is infused through the system. The contents of the flask are heated to 38° C. The solution of the compound of formula (17) is added dropwise to the stirring gluconolactone solution. The reaction is stirred at 38° C. overnight. The mixture is then cooled and stirred at room temperature over the weekend. The solvent is removed under vacuum. There are obtained 10.59 g of a product according to formula (17) wherein the amino groups are each substituted by a radical of formula —NH—C(O)—CH(OH)—CH(OH)—CH(OH)—CH(OH)—CH$_2$—OH.

c) 4.00 g (0.094 mmol) of the product obtained according to step (b) are weighted into a three-necked round-bottomed flask, along with 25.59 g tetrahydrofuran. Next, 1.30 g (1.32 mmol) PEG(750)-IPDI obtained according to step a) and 0.07 g (0.45 mmol) isocyanatoethyl methacrylate are added to the flask, and the mixture stirred. The flask is placed atop a stir plate and equipped with heating mantle, condenser, and thermometer. Dry air is infused throught the system. The reactants are brought to 41° C., and 100 mg dibutyltin dilaurate are added to the reaction mixture. The mixture is stirred at 41° C. over the weekend. The mixture is then cooled and the solvent removed under reduced pressure. 5.30 g of a clear, crystalline compound corresponding to formula (17) wherein the amino groups are each substituted by a radical of formula —NH—C(O)—CH(OH)—CH(OH)—CH(OH)—CH(OH)—CH$_2$—OH and about 13% of the hydroxy groups are substituted by a radical of formula

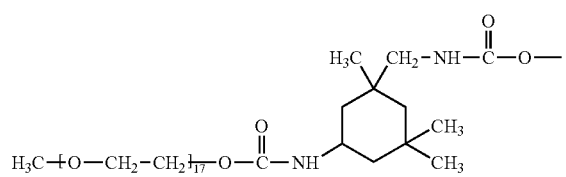

and about 4% of the hydroxy groups are substituted by a radical of formula

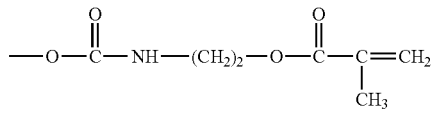

are recovered.

d) 1.1 g of the product obtained according to step c) are mixed with 1.1 g ethanol and 9.4 mg of a photoinitiator (Darocur® 1173). This formulation is cast on quartz plates that have been soaked overnight in KOH/isopropanol, rinsed with ethanol, then rinsed with purified water and air dried. The films are cured for 90 seconds under a UV lamp, and extracted with an isopropanol/water mixture. Dynamic contact angle measurements are obtained which indicate a high wettability of the films obtained.

Example 4

A 50 ml addition funnel containing 1.0 g of the compound of formula

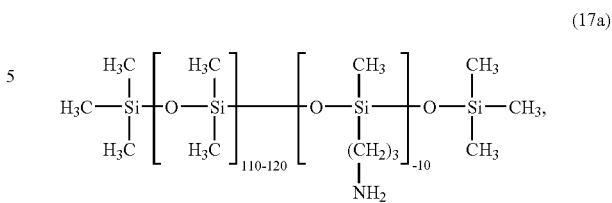

$M_w$ about 10000, and 10.2 g dry methylene chloride. The flask is placed atop a stir plate, and a septum placed in the add-funnel neck. Stirring is started and addition of the polymethyl oxazoline materials starts. The addition takes 40 minutes, after which the mixture is stirred an additional 4 hours at room temperature. One drop of DBTDL is added to the reaction mixture, which is stired an additional hour. The solvent is then removed via rotary evaporation.

The macromer obtained above is formulated 68.62% in water containing 0.5% of a photoinitiator (Irgacure® 2959). It is centrifuged and stirred. The formulation is cast on quartz plates, and cured for 60 seconds. Thereafter the flats are pealed off the quartz plates, placed in water and autoclaved. Dynamic contact angle measurements are obtained which indicate a high wettability of the films obtained.

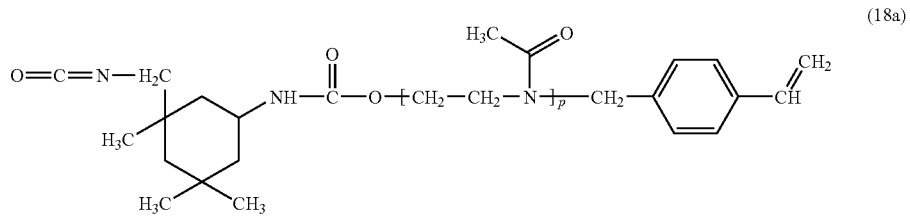

($M_w$~1500, synthesis from HO—(CH$_2$CH$_2$N[C(O)CH$_3$])$_p$—CH$_2$—C$_6$H$_5$—CH=CH$_2$) prepared according to S. Kobayashi et al., Polymer Bulletin 13, p 447-451 (1985) and isophorone diisocyanate) and and 1.0 g of the compound of formula Comparative Example The manufacture of the molding above is repeated but using 2 g of the compound of formula (18a) instead of the mixture of 1 g each of a compound of formula (18a) and (18b). Dynamic contact angle measurements are obtained which indicate a considerable decrease in wettability compared to the molding obtained with the mixture of compounds (18a) and (18b).

What is claimed is:
1. An amphiphilic block copolymer of formula

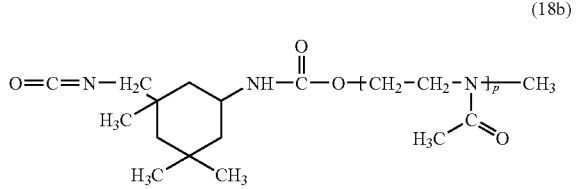

($M_w$~1300, synthesis from isophorone diisocyanate and HO—(CH$_2$CH$_2$N[C(O)CH$_3$])$_p$—CH$_3$ in 10.1 g dry methylene chloride is placed atop a 100 ml round-bottomed flask, equipped with a stir bar and containing 3.0 g of the distilled compound of formula

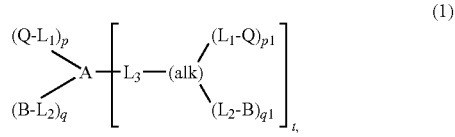

wherein A is a hydrophobic polysiloxane or perfluoroalkyl polyether segment;

B is a surface-modifying hydrophilic segment having a weight average molecular weight of $\geq 100$ that is devoid of a crosslinkable group;

Q is a moiety comprising at least one crosslinkable ethylenically unsaturated group;

(alk) is $C_2$-$C_{20}$-alkylene which is unsubstituted or substituted by hydroxy;

$L_1$, $L_2$ and $L_3$ are each independently of the other a linking group;

p1 and q1 are each independently of the other an integer from 1 to 12; and either t is 0 and p and q are each independently of the other an integer from 2 to 20; or t is an integer from 1 to 8 and p and q are each 0.

2. An amphiphilic block copolymer according to claim 1 of formula

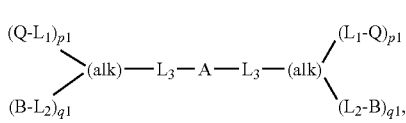
(1a)

wherein A, B, $L_1$, $L_2$, $L_3$, Q, (alk), p1 and q1 are each as defined in claim 1.

3. An amphiphilic block copolymer according to claim 1 of formula $$(B-L_2)_q-A-(L_1-Q)_p \quad (1b),$$

wherein A, B, $L_1$, $L_2$ and Q are each as defined in claim 1, and p and q are each independently of the other an integer from 2 to 20.

4. An amphiphilic block copolymer according to claim 1, wherein A is a polysiloxane segment of formula

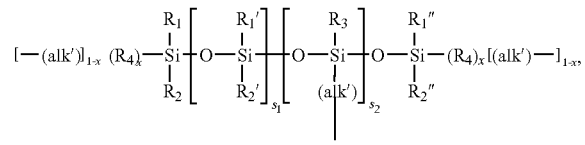
(2)

wherein (alk') is alkylene having 1 to 20 carbon atoms which may be interrupted by —O—;

x is 0 or 1;

80 to 100% of the radicals $R_1$, $R_1'$, $R_1''$, $R_2$, $R_2'$, $R_2''$, $R_3$ and $R_4$, independently of one another, are $C_1$-$C_8$-alkyl, and 0-20% of the radicals $R_1$, $R_1'$, $R_1''$, $R_2$, $R_2'$, $R_2''$, $R_3$ and $R_4$, independently of one another, are unsubstituted or $C_1$-$C_4$ alkyl- or $C_1$-$C_4$-alkoxy-substituted phenyl, fluoro($C_1$-$C_{18}$-alkyl) or cyano($C_1$-$C_{12}$-alkyl), $s_1$ is an integer from 5 to 700;

$s_2$ is the sum of (p+q+t−2) if x is 0, and is the sum of (p+q+t) if x is 1; wherein p, q and t are as defined in claim 1, and the sum ($s_1+s_2$) is from 5 to 700.

5. An amphiphilic block copolymer according to claim 1, wherein $L_1$, $L_2$ and $L_3$ are each independently of the other a bivalent linking group of formula —$X_1$—C(O)—NH—$R_{10}$—NH—C(O)—$X_2$— (4a), —$X_1$—C(O)—$R_{10}$—C(O)—$X_2$— (4b), —$X_1$—C(O)— (4c), —C(O)—$X_2$— (4d), or —$X_1$—C(O)—$X_2$— (4e), wherein $X_1$ and $X_2$ are each independently of the other a group —O—, —S— or —$NR_0$—, $R_0$ is hydrogen or $C_1$-$C_4$-alkyl, and $R_{10}$ is linear or branched $C_1$-$C_{18}$-alkylene or unsubstituted or $C_1$-$C_4$-alkyl- or $C_1$-$C_4$-alkoxy-substituted $C_6$-$C_{10}$-arylene, $C_7$-$C_{18}$-aralkylene, $C_6$-$C_{10}$-arylene-$C_1$-$C_2$-alkylene-$C_6$-$C_{10}$-arylene, $C_3$-$C_8$-cycloalkylene, $C_3$-$C_8$-cycloalkylene-$C_1$-$C_6$-alkylene, $C_3$-$C_8$-cycloalkylene-$C_1$-$C_2$-alkylene-$C_3$-$C_8$-cycloalkylene or $C_1$-$C_6$-alkylene-$C_3$-$C_8$-cycloalkylene-$C_1$-$C_6$-alkylene.

6. An amphiphilic block copolymer according to claim 5, wherein $L_1$ is a linking group of formula (4a), (4c) or (4e), $L_2$ is a linking group of formula (4a), and $L_3$ is a linking group of formula (4b) or (4c).

7. An amphiphilic block copolymer according to claim 1, wherein B is a non-ionic segment selected from the group consisting of a polyoxyalkylene, polysaccharide, polypeptide, poly(vinylpyrrolidone), polyalkylacrylate, polymethacrylate, polyhydroxyalkylacrylate, polyhydroxymethacrylate, polyacryl alkylene imine, polyacryl amide, polyvinyl alcohol, polyvinyl ether and a polyol, or B is a polyionic segment selected from the group consisting of a polyallylammonium, polyethyleneimine, polyvinylbenzyltrimethylammonium, polyaniline, sulfonated polyaniline, polypyrrole, polypyridinium segment, polyacrylic acid, polymethacrylic acid, a polythiophene-acetic acid, a polystyrenesulfonic acid and a zwitterionic segment, or a salt thereof.

8. An amphiphilic block copolymer according to claim 1, wherein Q is a radical $Q_1$ of formula

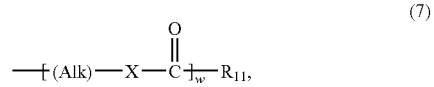
(7)

wherein (Alk) is linear or branched $C_1$-$C_{12}$-alkylene, X is —O— or —NH—, $R_{11}$ is an olefinically unsaturated copolymerisable radical having from 2 to 24 carbon atoms which is unsubstituted or further substituted by $C_1$-$C_4$alkoxy, halogen, phenyl or carboxy, and w is the number 0 or 1.

9. An amphiphilic block copolymer according to claim 1, wherein Q is a polyoxyalkylene, poly(vinylpyrrolidone), poly(hydroxyethylacrylate), poly(hydroxyethylmeth-acrylate), polyacrylamide, poly(N,N-dimethylacrylamide), polyacrylic acid, polymethacrylic acid, polyacyl alkylene imine or a copolymeric mixture of two or more of the above-mentioned polymers which in each case comprises one or more ethylenically unsaturated bond and has a weight average molecular weight of $\geq 100$.

10. An amphiphilic block copolymer according to claim 9, wherein Q is a hydrophilic segment of formula —((alk'')—O)$_c$—[(CH$_2$—CH$_2$—O)$_a$—(CHR$_6$—CHR$_7$—O)$_b$]—(alk'')—$L_1'$—$Q_2$ (5a)

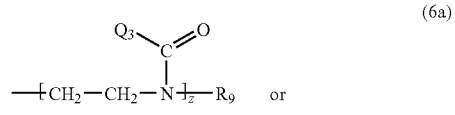
(6a)

-continued

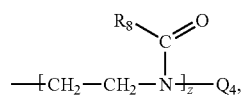
(6b)

wherein $L_1'$ is a bivalent linking group of formula $$—X_1—C(O)—NH—R_{10}—NH—C(O)—X_2— \quad (4a),$$

$$—X_1—C(O)—R_{10}—C(O)—X_2— \quad (4b),$$

$$—X_1—C(O)— \quad (4c),$$

$$—C(O)—X_2— \quad (4d), \text{ or}$$

$$—X_1—C(O)—X_2— \quad (4e),$$

wherein $X_1$ and $X_2$ are each independently of the other a group —O—, —S— or —$NR_0$—, $R_0$ is hydrogen or $C_1$-$C_4$-alkyl, and $R_{10}$ is linear or branched $C_1$-$C_{18}$-alkylene or unsubstituted or $C_1$-$C_4$-alkyl- or $C_1$-$C_4$-alkoxy-substituted $C_6$-$C_{10}$-arylene, $C_7$-$C_{18}$-aralkylene, $C_6$-$C_{10}$-arylene-$C_1$-$C_2$-alkylene-$C_6$-$C_{10}$-arylene, $C_3$-$C_8$-cycloalkylene, $C_3$-$C_8$-cycloalkylene-$C_1$-$C_6$-alkylene, $C_3$-$C_8$-cycloalkylene-$C_1$-$C_2$-alkylene-$C_3$-$C_8$-cycloalkylene or $C_1$-$C_6$-alkylene-$C_3$-$C_8$-cycloalkylene-$C_1$-$C_6$-alkylene, $Q_2$ is a radical of formula

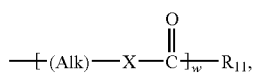
(7)

wherein (Alk) is linear or branched $C_1$-$C_{12}$-alkylene, X is —O— or —NH—, $R_{11}$ is an olefinically unsaturated copolymerisable radical having from 2 to 24 carbon atoms which is unsubstituted or further substituted by $C_1$-$C_4$alkoxy, halogen, phenyl or carboxy, and w is the number 0 or 1, $Q_3$ is $C_3$-$C_{12}$-alkenyl or a radical —$(CH_2)_{1-4}$—O—$R_{16}$ wherein $R_{16}$ is acryloyl, methacryloyl or a group —C(O)—NH—$(CH_2)_{2-4}$—O—C(O)—C($R_{17}$)=$CH_2$ and $R_{17}$ is hydrogen or methyl, $Q_4$ is a radical of formula

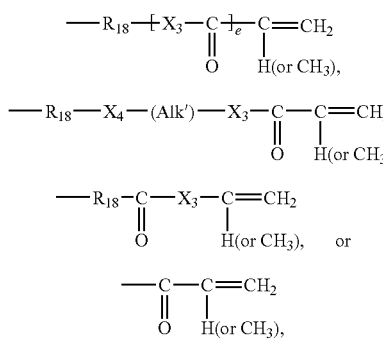

wherein $X_3$ is —O— or —NR—, R is hydrogen or $C_1$-$C_4$-alkyl, $X_4$ is a group —C(O)—O—, —O—C(O)—NH— or —NH—C(O)—O—, (Alk') is $C_1$-$C_8$-alkylene, e is an integer of 0 or 1, and $R_{18}$ is $C_1$-$C_{12}$-alkylene, phenylene or $C_7$-$C_{12}$-phenylenealkylene, one of the radicals $R_6$ and $R_7$ is hydrogen and the other is methyl, (alk'') is $C_1$-$C_6$-alkylene, c is the number 0 or 1, and each of a and b independently of the other is a number from 0 to 100, the sum of (a+b) being from 2 to 100, $R_8$ is hydrogen; $C_1$-$C_{12}$-alkyl unsubstituted or substituted by hydroxy or fluoro and/or uninterrupted or interrupted by oxygen; $C_5$-$C_8$-cycloalkyl; phenyl; or benzyl, $R_9$ is $C_1$-$C_{12}$-alkyl, benzyl, $C_2$-$C_4$-alkanoyl, benzoyl or phenyl, and z is an integer from 2 to 150.

11. An amphiphilic block copolymer according to claim 2 of formula (1a), wherein A is a polysiloxane segment of formula

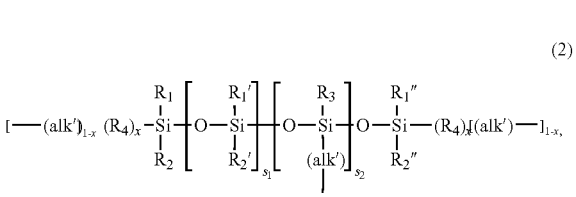
(2)

wherein x and $s_2$ are each 0, and $R_1$, $R_1''$, $R_2$, $R_2'$, $R_2''$, $R_3$ and $R_4$ are each independently of one another $C_1$-$C_4$-alkyl, B is a polyoxyalkylene, poly(vinylpyrrolidone), poly(hydroxyethylacrylate), poly(hydroxyethylmethacrylate), polyacrylamide, poly(N,N-dimethylacrylamide), polyacrylic acid, polymethacrylic acid, polyacyl alkylene imine or a copolymeric mixture of two or more of the above-mentioned polymers, $L_1$ is a linking group of formula $$—X_1—C(O)—NH—R_{10}—NH—C(O)—X_2— \quad (4a),$$

$$—X_1—C(O)— \quad (4c), \text{ or}$$

$$—X_1—C(O)—X_2— \quad (4e),$$

$L_2$ is a linking group of the above formula (4a), and $L_3$ is a linking group of the above formula (4c) or of the formula $$—X_1—C(O)—R_{10}—C(O)—X_2— \quad (4b),$$

wherein $X_1$ and $X_2$ are each independently of the other a group —O—, —S— or —$NR_0$—, $R_0$ is hydrogen or $C_1$-$C_4$-alkyl, and $R_{10}$ is linear or branched $C_1$-$C_{18}$-alkylene or unsubstituted or $C_1$-$C_4$-alkyl- or $C_1$-$C_4$-alkoxy-substituted $C_6$-$C_{10}$-arylene, $C_7$-$C_{18}$-aralkylene, $C_6$-$C_{10}$-arylene-$C_1$-$C_2$-alkylene-$C_6$-$C_{10}$-arylene, $C_3$-$C_8$-cycloalkylene, $C_3$-$C_8$-cycloalkylene-$C_1$-$C_6$-alkylene, $C_3$-$C_8$-cycloalkylene-$C_1$-$C_2$-alkylene-$C_3$-$C_8$-cycloalkylene or $C_1$-$C_6$-alkylene-$C_3$-$C_8$-cycloalkylene-$C_1$-$C_6$-alkylene, Q is a radical $Q_1$ of formula

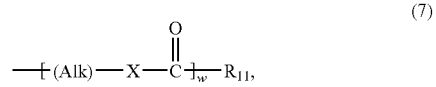
(7)

wherein (Alk) is linear or branched $C_1$-$C_{12}$-alkylene, X is —O— or —NH—, $R_{11}$ is an olefinically unsaturated copolymerisable radical having from 2 to 24 carbon atoms which is unsubstituted or further substituted by $C_1$-$C_4$alkoxy, halogen, phenyl or carboxy, and w is the number 0 or 1, or Q is a polyoxyalkylene, poly(vinylpyrrolidone), poly(hydroxyethylacrylate), poly(hydroxyethylmeth-acrylate), polyacrylamide, poly(N,N-dimethylacrylamide), polyacrylic acid, polymethacrylic acid, polyacyl alkylene imine or a copolymeric mixture of two or more of the above-mentioned polymers which in each case comprises one or more ethylenically unsaturated bond and has a weight average molecular weight of $\geqq 100$, and p1 is an integer from 1 to 6, and q1 is an integer from 1 to 8.

12. An amphiphillic block copolymer according to claim 3 of formula (1b), wehrein A,B, $L_1$, $L_2$ and Q are defined in claim 11, and p and q are each independently of the other an integer of 2 to 15.

* * * * *